United States Patent
Gee et al.

(10) Patent No.: US 7,353,371 B2
(45) Date of Patent: Apr. 1, 2008

(54) CIRCUIT TO EXTRACT NONADJACENT BITS FROM DATA PACKETS

(75) Inventors: Corey Gee, Fremont, CA (US); Bapi Vinnakota, Fremont, CA (US)

(73) Assignee: Intel Corporation, Santa Clara, CA (US)

(*) Notice: Subject to any disclaimer, the term of this patent is extended or adjusted under 35 U.S.C. 154(b) by 1180 days.

(21) Appl. No.: 10/314,194

(22) Filed: Dec. 5, 2002

(65) Prior Publication Data

US 2004/0109444 A1  Jun. 10, 2004

(51) Int. Cl.
*G06F 7/00* (2006.01)
(52) U.S. Cl. .......................... 712/300; 712/4; 712/204; 712/223; 712/225; 377/54; 377/64
(58) Field of Classification Search .............. 712/4, 712/204, 220, 223, 224, 225, 300; 377/54, 377/57, 64
See application file for complete search history.

(56) References Cited

U.S. PATENT DOCUMENTS 4,821,208 A * 4/1989 Ryan et al. ............... 345/550
5,875,355 A * 2/1999 Sidwell et al. ............ 712/300

OTHER PUBLICATIONS

Tri Media, TM1000 Preliminary Data Book, 1997, Philips Electronics North America Corporation, pp. 3-1, A-129, to A-134.*

* cited by examiner

*Primary Examiner*—Tonia L. Meonske
(74) *Attorney, Agent, or Firm*—Blakely, Sokoloff, Taylor & Zafman LLP

(57) ABSTRACT

A method and device to copy data fields from one or more source packets to one or more result packets. In a SET function, adjacent data fields in a source packet is copied to respective destination data fields in a result packet governed by a field locator packet. In an ESET function, data fields in respective source packets are copied to adjacent data fields in a result packet governed by a field locator packet. In an EXTRACT function, data fields in a source packet are copied to adjacent data fields in a result packet governed by a field locator packet. In a SCATTER function, adjacent data fields in a source packet are copied to data fields in respective result packets governed by a field locator packet.

6 Claims, 10 Drawing Sheets

CIRCUIT TO EXTRACT NONADJACENT BITS FROM DATA PACKETS

FIELD

Embodiments of the invention relates generally to data packet processing, and in particular, to an apparatus and method to extract data logical values at arbitrary bit positions in a data packet.

BACKGROUND

In voice processing and other data processing, manipulation of data within data packets is often desirable. For instance, manipulation of headers or other data fields within a packet is often required for complex protocols such as asynchronous transfer mode (ATM) and ATM adaptation layers (AAL). It is desirable to manipulate data within data packets efficiently to reduce processing power and time consumption.

Typically, processors, such as reduced instruction set computer (RISC) processors, are used to manipulate data packets. However, RISC processors operate on bytes or words (2 or 4 bytes) instead on the bit level. Accordingly, if a data field has a length less than a byte or a word, there is some inefficiency in manipulation of the data using a RISC processor since some bits which need not be affected are manipulated. In addition, with a RISC processor, simple bit manipulation operations typically require a large number of cycles, which again makes bit manipulation rather inefficient, power and time consuming.

DETAILED DESCRIPTION

Figure 1:
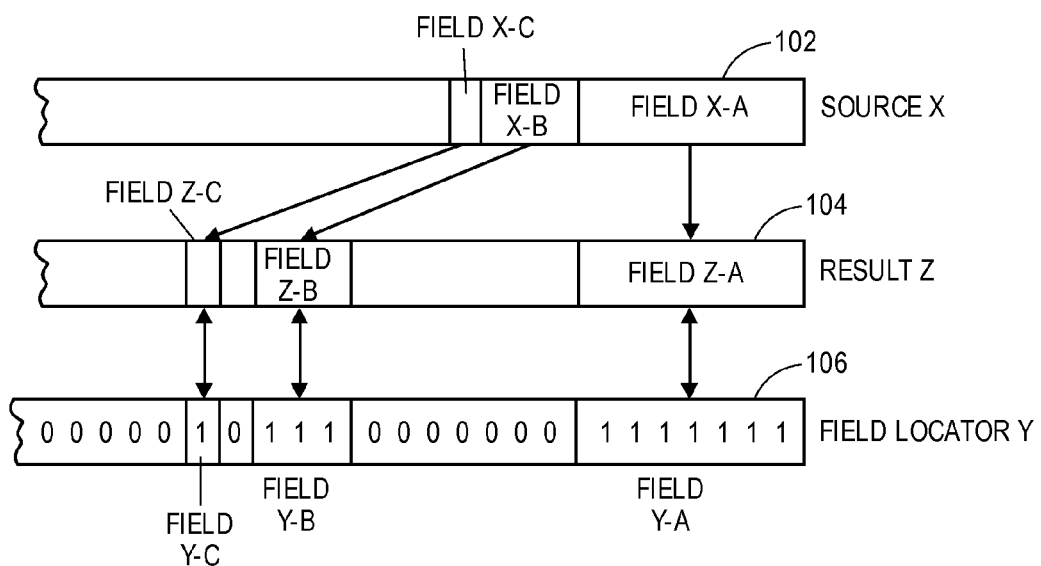
FIG. 1 illustrates diagrams of exemplary source, result, and field locator packets undergoing a SET function in accordance with an embodiment of the invention.

FIG. 1 illustrates diagrams of an exemplary source packet X 102, result packet Z 104, and field locator packet Y 106 undergoing a SET function in accordance with an embodiment of the invention. In a SET function, adjacent data fields in the source packet X 102 are copied to fields in the result packet Z 104 in accordance with the field locator packet Y 106. For instance, the adjacent data fields Field X-A, Field X-B, and Field X-C in source packet X 102 are copied respectively to data fields Field Z-A, Field Z-B, and Field Z-C of result packet Z 104. The data fields Field Z-A, Field Z-B, and Field Z-C of result packet Z 104 need not be adjacent to each other.

The field locator packet Y defines the destination fields Field Z-A, Field Z-B, and Field Z-C of the result packet Z 104. For instance, the field locator packet Y 106 has three fields Field Y-A, Field Y-B, and Field Y-C with their respective bits being asserted. The remaining fields of the field locator packet Y 106 have their respective bits non-asserted. The asserted fields Field Y-A, Field Y-B, and Field Y-C of the field locator packet Y 106 have the same respective bit positions as the destination data fields Field Z-A, Field Z-B, and Field Z-C of the result packet Z 104. This is one way that the field locator packet Y identifies the locations of Field Z-A, Field Z-B, and Field Z-C of the result packet Z 104 to which the adjacent data fields of the source packet X 102 are to be copied.

Figure 2:
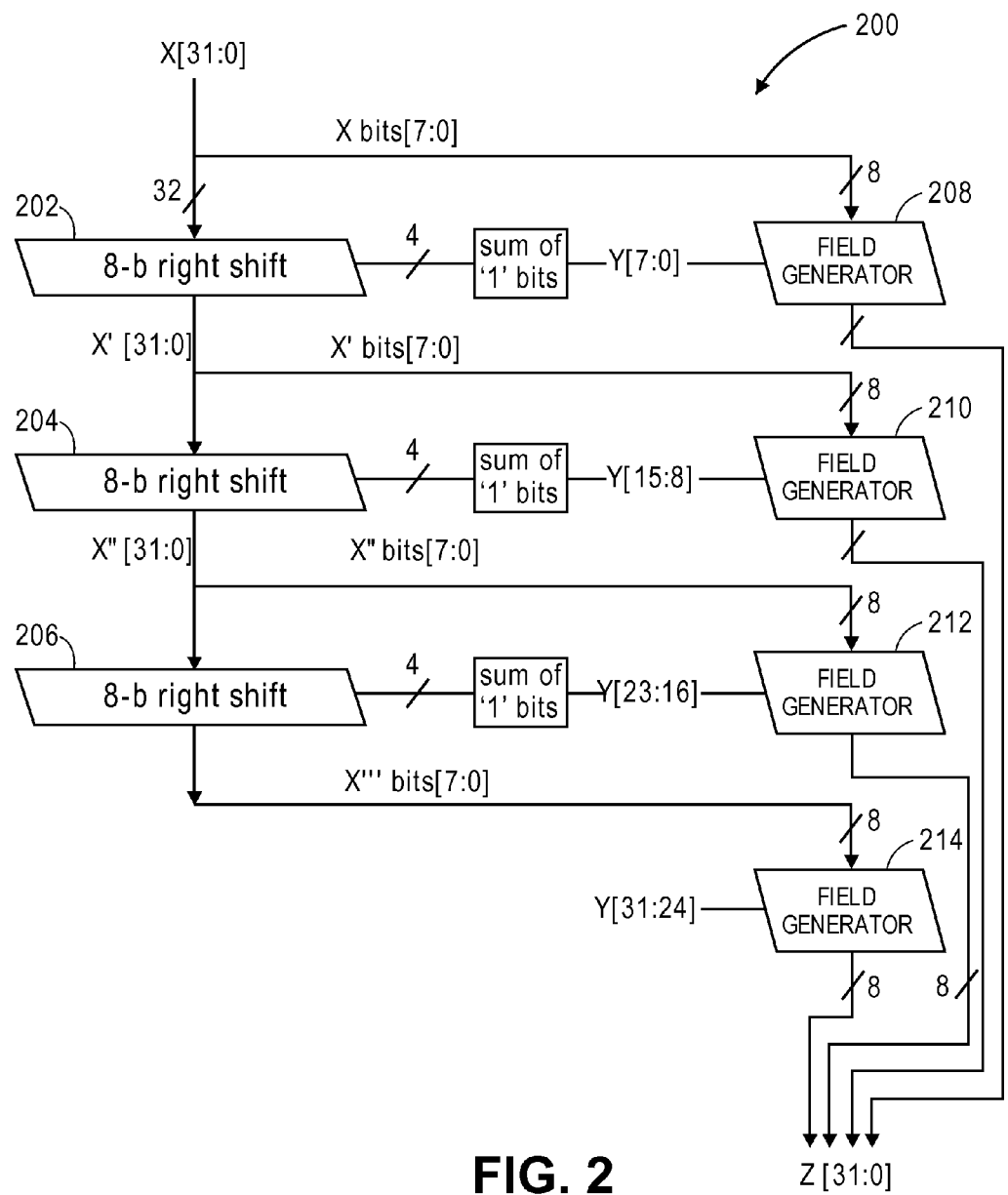
FIG. 2 illustrates a block diagram of an exemplary SET logic device that performs the SET function in accordance with an embodiment of the invention.

FIG. 2 illustrates a block diagram of an exemplary SET logic device 200 that performs the SET function in accordance with an embodiment of the invention. In this example, the SET logic device 200 implements the SET function for a source, result, and field locator packets, each being 32 bits in length. The exemplary logic device 200 comprises a plurality of 8-bit right shifters 202, 204, and 206 and a plurality of data field generators 208, 210, 212, and 214. The 8-bit right shifters 202, 204 and 206 generate the appropriate source bits for the respective field generators 210, 212 and 214.

The source packet X|[31:0] is coupled to an input of the first 8-bit right shifter 202 and the 8 least significant bits X[7:0] of the source packet X are coupled to an input of the first field generator 208. The sum of asserted bits within the 8 least significant bits Y[7:0] of the field locator packet Y controls the amount of right shifting of the first 8-bit right shifter 202. Also, the 8 least significant bits Y[7:0] of the field locator packet Y serve as another input to the field locator 208.

The output X'[31:0] of the first 8-bit right shifter 202 is coupled to the input of the second 8-bit right shifter 204 and the 8 least significant bits X'[7:0] of the output of the first 8-bit right shifter 202 are coupled to the input of the of the second field generator 210. The sum of asserted bits within the next 8 significant bits Y[15:8] of the field locator packet Y controls the amount of right shifting of the second 8-bit right shifter 204. Also, the next 8 significant bits Y[15:8] of the field locator packet Y serve as another input to second field generator 210.

The output X"[31:0] of the second right shifter 204 is coupled to the input of the third right shifter 206 and the 8 least significant bits X"[7:0] of the output of the second right shifter 204 are coupled to the input of the third field generator 212. The sum of asserted bits within the next 8 significant bits Y[23:16] of the field locator packet Y controls the amount of right shifting of the third right shifter 206. Also, the next 8 significant bits Y[23:16] of the field locator packet Y serve as another input to third field generator 212.

The output X'''[31:0] of the third 8-bit third right shifter 206 is coupled to the input of the fourth field generator 214. The next 8 significant bits Y[31:24] of the field locator packet Y serve as another input to the fourth field generator 214.

Figure 3:
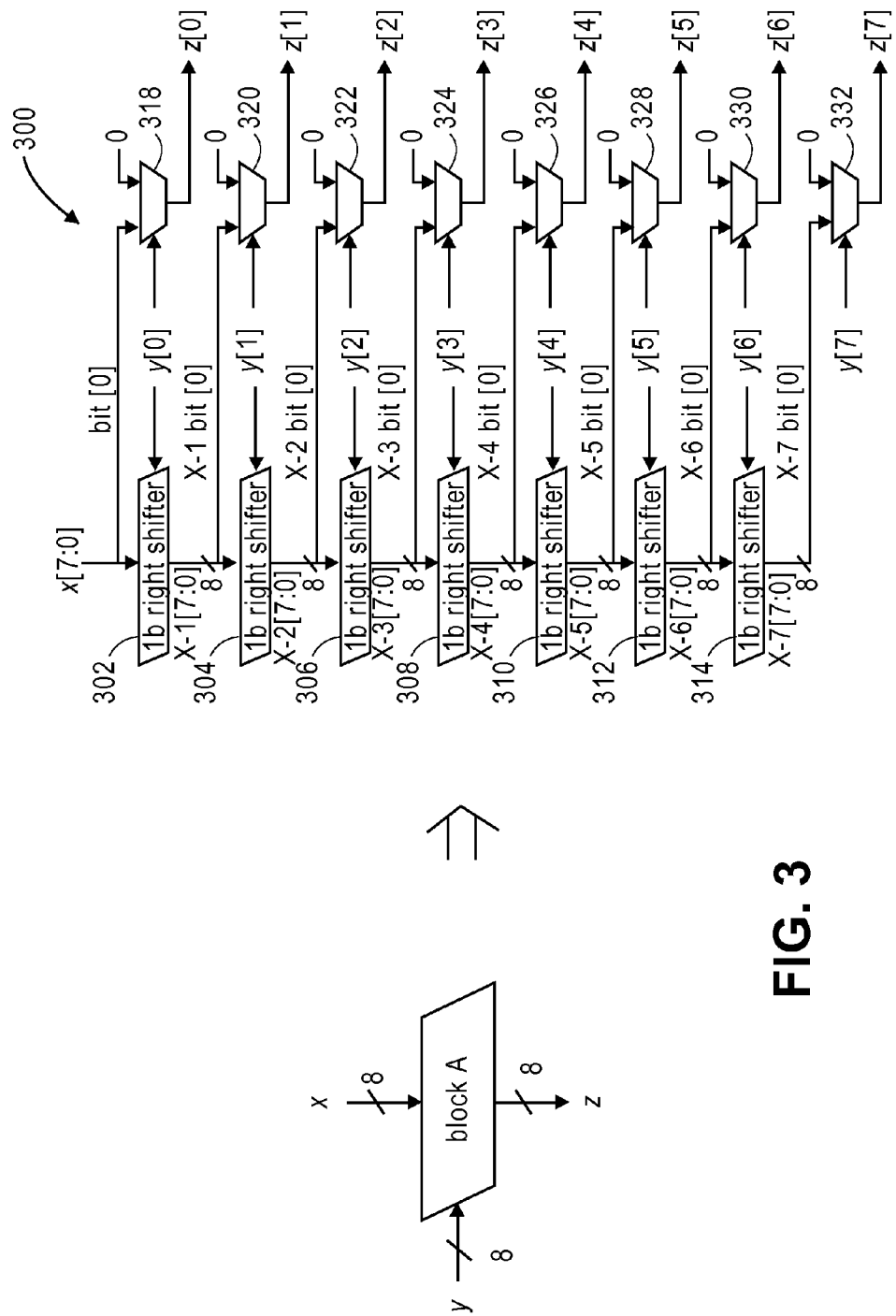
FIG. 3 illustrates a block diagram of an exemplary sub-device of the SET logic device that performs the SET functions in accordance with another embodiment of the invention.

FIG. 3 illustrates a block diagram of an exemplary field generator 300 of the SET logic device 200 that performs the SET function in accordance with another embodiment of the invention. The field generator 300 comprises a plurality of 1-bit right shifters 302, 304, 306, 308, 310, 312, and 314. The field generator 300 further comprises a plurality of two-input-one-output multiplexers 318, 320, 322, 324, 326, 328, 330, and 332. The first field generator 208 (FIG. 2) will serve as an example with the inputs being the 8 least significant bits X[7:0] of the source packet X and the 8 least significant bits Y[7:0] of the field locator packet Y. It shall be understood that the other field generators 210, 212, and 214 are the same as field generator 300 except that the inputs are respectively X'[7:0], Y[15:8], and X''[7:0], Y[23:16], and X'''[7:0]Y[31:24].

The 8 least significant bits X[7:0] of the source packet X serve as an input to the first 1-bit right shifter 302 and its least significant bit X[0] serves as an input to the first multiplexer 318. The other input of the first multiplexer 318 is a logic zero. The least significant bit Y[0] of the field locator packet Y serves as the respective control inputs to the first 1-bit right shifter 302 and the first multiplexer 318. The output X-1[7:0] of the first 1-bit right shifter 302 serves as an input to the second 1-bit right shifter 304 and its least significant bit X-1[0] serves as an input to the second multiplexer 320. The other input of the second multiplexer 320 is a logic zero. The next significant bit Y[1] of the field locator packet Y serves as the respective control inputs to the second 1-bit right shifter 304 and the second multiplexer 320.

The output X-2[7:0] of the second 1-bit right shifter 304 serves as the input to the third 1-bit right shifter 306 and its least significant bit X-2[0] serves as an input to the third multiplexer 322. The other input of the third multiplexer 322 is a logic zero. The next significant bit Y[2] of the field locator packet Y serves as the respective control inputs to the third 1-bit right shifter 306 and the third multiplexer 322.

The output X-3[7:0] of the third 1-bit right shifter 306 serves as the input to the fourth 1-bit right shifter 308 and its least significant bit X-3[0] serves as an input to the fourth multiplexer 324. The other input of the fourth multiplexer 324 is a logic zero. The next significant bit Y[3] of the field locator packet Y serves as the respective control inputs to the fourth 1-bit right shifter 308 and the fourth multiplexer 324.

The output X-4[7:0] of the fourth 1-bit right shifter 308 is coupled to the fifth 1-bit right shifter 310 and its least significant bit X-4[0] serves as an input to the fifth multiplexer 326. The other input of the fifth multiplexer 326 is a logic zero. The next significant bit Y[4] of the field locator packet Y serves as the respective control inputs to the fifth 1-bit right shifter 310 and the fifth multiplexer 326.

The output X-5[7:0] of the fifth 1-bit right shifter 310 is coupled to the sixth 1-bit right shifter 312 and its least significant bit X-5[0] serves as an input to the sixth multiplexer 328. The other input of the sixth multiplexer 328 is a logic zero. The next significant bit Y[5] of the field locator packet Y serves as the respective control inputs to the sixth 1-bit right shifter 312 and the sixth multiplexer 328.

The output X-6[7:0] of the sixth 1-bit right shifter 312 serves as the input to the seventh 1-bit right shifter 314 and its least significant bit X-6[0] serves as an input to the seventh multiplexer 330. The other input of the seventh multiplexer 330 is a logic zero. The next significant bit Y[6] of the field locator packet Y serves as the respective control inputs to the seventh 1-bit right shifter 314 and the seventh multiplexer 330.

The least significant bit X-7[0] of the output X-7[7:0] of the seventh 1-bit right shifter 314 serves as an input to the eighth multiplexer 332. The other input of the eighth multiplexer 322 is a logic zero. The next significant bit Y[7] of the field locator packet Y serves as the control input to the eighth multiplexer 332.

As an example, the following source X, result Z, and field locator Y packets are used to illustrate the operation of the SET logic device 200:

| | |
|---|---|
| 0 . . . 00000000000110011100101 | Source X |
| 0 . . . 00010100000000011100101 | Result Z |
| 0 . . . 00010111000000001111111 | Field Locator Y |

The source packet X[31:0] is applied to the input of the first 8-bit right shifter 202 and its 8 least significant bits X[7:0] are applied to the input of the field generator 208. The 8 least significant bits Y[7:0] of the field locator packet Y are applied to the field generator 208. Referring again to FIG. 3, since Y[7:0] are all asserted, they will cause a 1-bit shift of the 8 least significant bits X[7:0] respectively by the 1-bit right shifters. Thus, the following values holds:

| | | |
|---|---|---|
| X[0] | = | 1 |
| X-1[0] | = | 0 |
| X-2[0] | = | 1 |
| X-3[0] | = | 0 |
| X-4[0] | = | 0 |
| X-5[0] | = | 1 |
| X-6[0] | = | 1 |
| X-7[0] | = | 1 |

Since again 8 least significant bits Y[7:0] of the field locator Y are all asserted, they control the multiplexers to select as its output the corresponding X instead of the logic zero. Thus, the output of the field generator 208 is as follows:

Z[7:0]=11100101 which agrees with 8 least significant bits Z[7:0] of the result packet Z.

Referring again to FIG. 2, the number of asserted bits of the 8 least significant bits Y[7:0] of the field locator packet Y controls the amount of right shifting of the first 8-bit right shifter 202. Since in this example the 8 least significant bits Y[7:0] of the field locator packet Y have 8 asserted bits, the first 8-bit right shifter 202 right shifts the source packet X[31:0] by 8 positions to form X'[31:0] as follows:

X'[31:0]=0 . . . 0000000000001100

The 8 least significant bits X'[7:0] of the output of the first 8-bit right shift 202 serve as an input to the second field generator 210. The next significant bits Y[15:8] of the field locator packet Y are applied to the second field generator

210. Referring again to FIG. 3, since Y[15:8] are all non-asserted, they cause the multiplexers to output the logic zeros. Thus, the output of the second field generator 210 is as follows:

Z[15:8]=00000000

Referring again to FIG. 2, the number of asserted bits of the next significant bits Y[15:8] of the field locator packet Y controls the amount of right shifting of the second 8-bit right shifter 204. Since in this example the next significant bits Y[15:8] of the field locator packet Y have no asserted bits, the second 8-bit right shifter 204 does not right the output X'[31:0] of the first right shift 202. Thus, the output of the second right shift 204 is as follows:

X"[31:0]=0 . . . 0000000000001100

The 8 least significant bits X"[7:0] of the output of the second 8-bit right shift 204 serves as an input to the third field generator 212. The next significant bits Y[23:16] of the field locator packet Y is applied to, the third field generator 212. The Y[23:16] is as follows:

Y[23:16]=00010111

Referring again to FIG. 3, the least significant bit X"[0] is a logic zero and is applied to an input of the first multiplexer 318. Since the least significant bit Y[16] of Y[23:16] is a logic one, it causes the multiplexer 318 to output X"[0], which is a logic zero. Accordingly, the output Z[16] is a logic zero.

The asserted least significant bit Y[16] causes the 1-bit right shifter 302 to right shift X"[7:0] by one bit. Thus, X"-1[0] is also a logic zero and is applied to an input of the second multiplexer 320. Since the next significant bit Y[17] is a logic one, it causes the second multiplexer 320 to output X"-1[0], which is a logic zero. Accordingly, the output Z[17] is a logic zero.

The asserted bit Y[17] causes the 1-bit right shifter 304 to right shift X"-1[7:0] by one bit. Thus, X"-1[0] is a logic one and is applied to an input of the third multiplexer 322. Since the next significant bit Y[18] is a logic one, it causes the third multiplexer 322 to output X"-2[0], which is a logic one. Accordingly, the output Z[18] is a logic one.

The asserted bit Y[18] causes the 1-bit right shifter 306 to right shift X"-1[7:0] by one bit. Thus, X--3[0] is a logic one and is applied to an input of the fourth multiplexer 324. Since the next significant bit Y[19] is a logic zero, it causes the fourth multiplexer 324 to output a logic zero. Accordingly, the output Z[19] is a logic zero.

The non-asserted bit Y[19] causes the 1-bit right shifter 308 not to right shift X"-3[7:0]. Thus, X"-4[0] is therefore still a logic one and is applied to an input of the fifth multiplexer 326. Since the next significant bit Y[20] is a logic one, it causes the fifth multiplexer 326 to output a logic one. Accordingly, the output Z[20] is a logic zero. The remaining bits of source X are zeros, so the remaining bits Z[>23] are also logic zeros. Therefore, Z[23:16] is given by the following equation:

Z[23:16]=00010100

Accordingly, the result Z[31:0] is as stated above.

Figure 4:
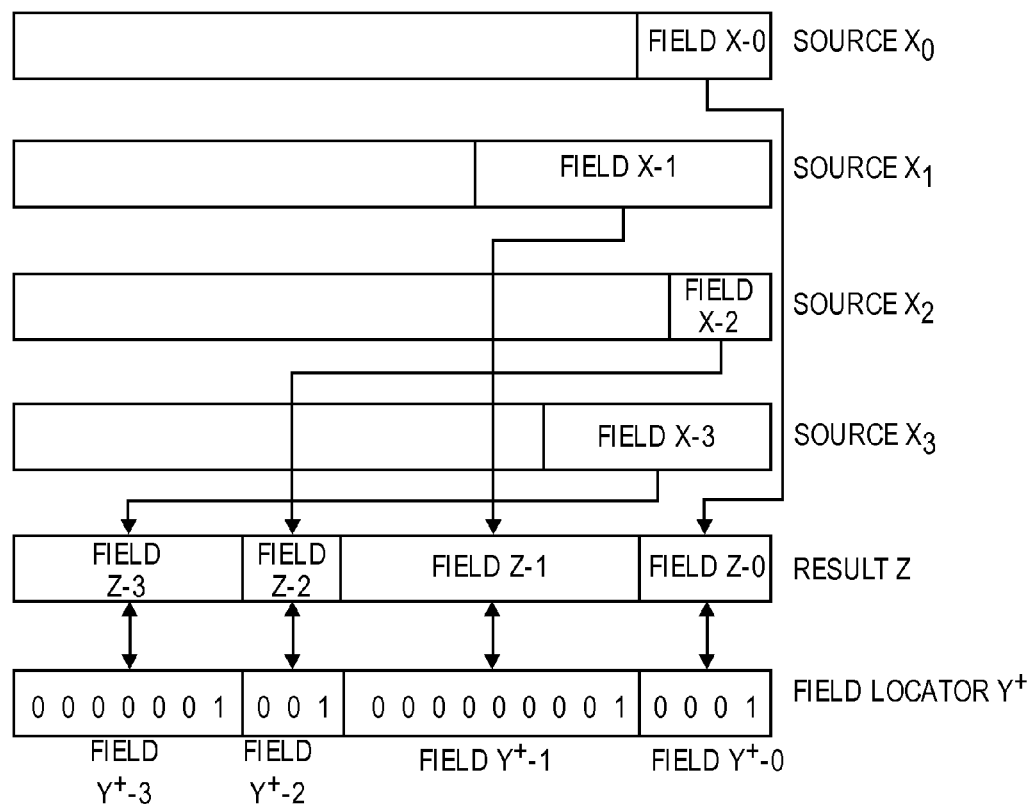
FIG. 4 illustrates diagrams of a plurality of exemplary sources, result, and field locator packets undergoing an ESET function in accordance with an embodiment of the invention.

FIG. 4 illustrates diagrams of a plurality of exemplary source packets $X_0$, $X_1$, $X_2$, and $X_3$, a result packet Z, and a field locator packet $Y^+$ undergoing an ESET function in accordance with an embodiment of the invention. According to the ESET function, a data field Field X-0 of source packet $X_0$ comprising its consecutive least significant bits is to be copied to a corresponding field Field Z-0 of result packet Z which also comprises its consecutive least significant bits. Also, a data field Field X-1 of source packet $X_1$ comprising its consecutive least significant bits is to be copied to a corresponding field Field Z-1 of result packet Z adjacent to field Z-0. Similarly, a data field Field X-2 of source packet $X_2$ comprising its consecutive least significant bits is to be copied to a corresponding field Field Z-2 of result packet Z adjacent to field Z-1. And, a data field Field X-3 of source packet $X_3$ comprising its consecutive least significant bits is to be copied to a corresponding field Field Z-3 of result packet Z adjacent to field Z-2.

The field locator packet $Y^+$ defines the data Fields Z-0, Z-1, Z-2 and Z-3 within the result packet Z. The field locator packet $Y^+$ includes Fields $Y^+$-0, $Y^+$-1, $Y^+$-2, and $Y^+$-3. Field $Y^+$-0 comprises an asserted least significant bit which defines the beginning of the field followed by three (3) zeros to define the extent of the field. Field $Y^+$-1 comprises an asserted least significant bit which defines the beginning of the field followed by eight (8) zeros to define the extent of the field. Field $Y^+$-2 comprises an asserted least significant bit which defines the beginning of the field followed by two (2) zeros to define the extent of the field. And, Field $Y^+$-3 comprises an asserted least significant bit which defines the beginning of the field followed by six (6) zeros to define the extent of the field. The bit positions of Fields $Y^+$-0, $Y^+$-1, $Y^+$-2, and $Y^+$-3 of the field locator packet $Y^+$ are the same as, and therefore define, the bit positions of destination data Fields Z-0, Z-1, Z-2 and Z-3 within the result packet Z.

Figure 5:
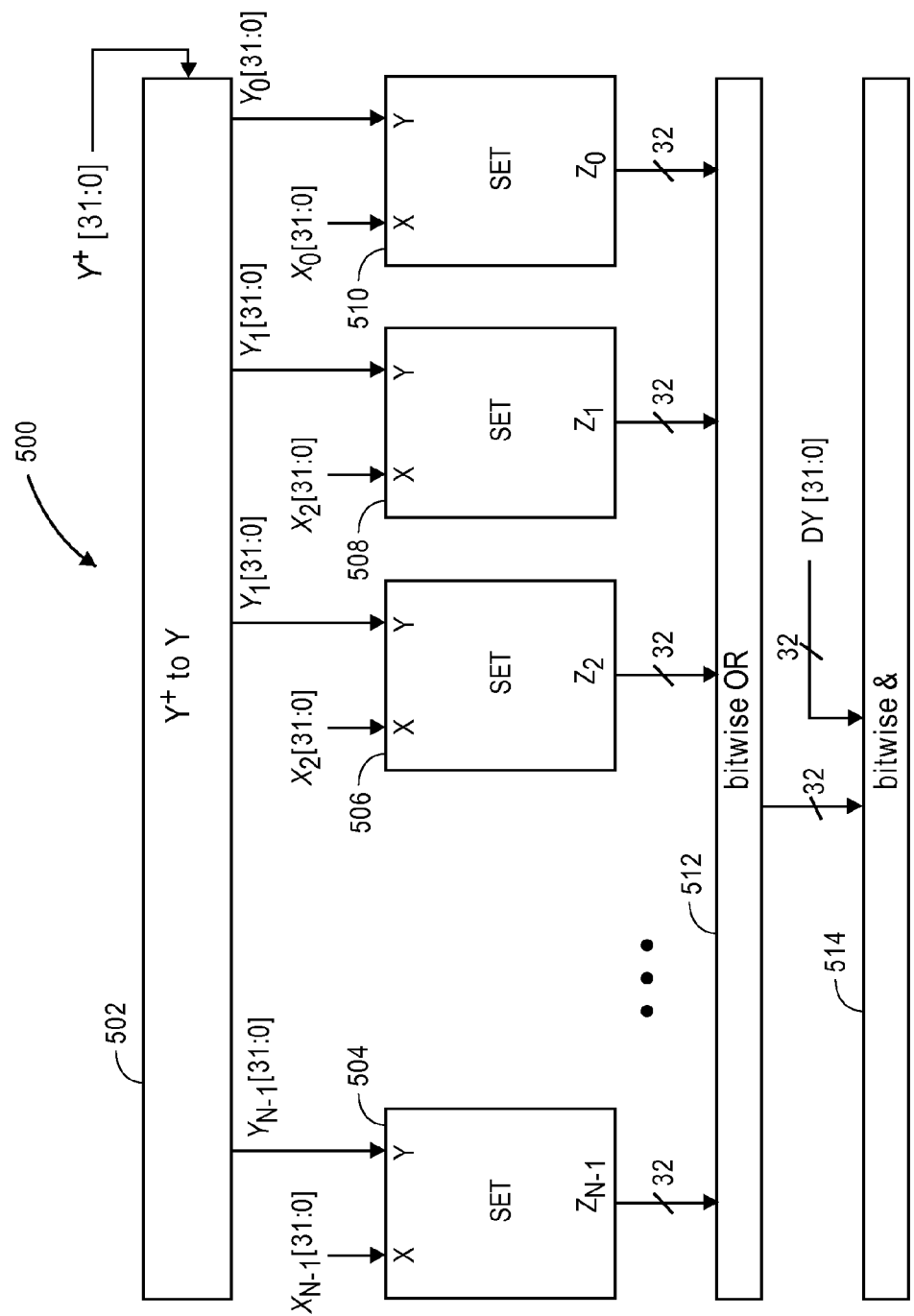
FIG. 5 illustrates a block diagram of an exemplary ESET logic device that performs the ESET function in accordance with an embodiment of the invention.

FIG. 5 illustrates a block diagram of an exemplary ESET logic device 500 that performs the ESET function in accordance with an embodiment of the invention. The logic device 500 comprises a $Y^+$-to-Y converter 502, a plurality of SET logic devices 504, 506, 508 and 510 which are the same as SET logic device 400 previously discussed, a bitwise OR logic device 512, and a bitwise AND logic device 514.

The $Y^+$-to-Y converter 502 converts the field locator packet type $Y^+$ to the field locator packet type Y. More specifically, as previously discussed, the field locator packet type $Y^+$ defines a field by having its least significant bit begin with a logic one (1) and the remaining more significant bits followed by zeros (0). Whereas, the field locator packet type Y defines a field by having all of its bits with a logic one (1). Thus, the $Y^+$-to-Y converter 502 converts a field in the field locator packet type $Y^+$ by substituting logic ones for the logic zeros in the field. If there is more than one field in the field locator packet type $Y^+$, then the $Y^+$-to-Y converter 502 generates a field locator type Y for each field defined in the locator packet type $Y^+$. Taking the field locator packet type $Y^+$ shown in FIG. 4 as an example, the following shows the $Y^+$-to-Y conversion by the $Y^+$-to-Y converter 502:

| | | |
|---|---|---|
| $Y^+$ | = | 00000010010000000010001 |
| $Y_0$ | = | 00000000000000000001111 |
| $Y_1$ | = | 00000000001111111110000 |
| $Y_2$ | = | 00000001110000000000000 |
| $Y_3$ | = | 11111110000000000000000 |

As the above example illustrates, the zeros in the respective fields of the field locator packet $Y^+$ are converted into logic ones. Also, each field in the field locator packet $Y^+$ generates a corresponding field locator packet type Y.

As shown in FIG. 5, the SET logic devices 504, 506, 508, and 510 receive as inputs respective source packets $X_{N-1}$[31:0], $X_2$[31:0], $X_1$[31:0] and $X_0$[31:0]. Also, the SET logic devices 504, 506, 508, and 510 receive as inputs respective field locator packets $Y_{N-1}[31:0]$, $Y_2[31:0]$, $Y_1[31:0]$ and $Y_0[31:0]$ converted from the field locator packet $Y^+$. The SET logic devices 504, 506, 508, and 510 generate at their respective outputs the semi-result packets $Z_{N-1}[31:0]$, $Z_2[31:0]$, $Z_1[31:0]$ and $Z_0[31:0]$. Each of the semi-result packets include a field comprising the data in a field in the respective source packet X consisting of the least significant bits having a length defined by the corresponding field in the field locator packet Y and at the same bit position as the field in the field locator packet Y. Taking the example shown in FIG. 4, the following relationship holds:

| | | |
|---|---|---|
| $Y+$ | = | Field Y-N-1 . . . Field Y-2 Field Y-1 Field Y-0 |
| $X_0$ | = | 000000000000000000000000000Field X-0 |
| $Z_0$ | = | 000000000000000000000000000Field X-0 |
| $Y_0$ | = | 000000000000000000000000000Field Y-0 |
| $X_1$ | = | 000000000000000000000000000Field X-1 |
| $Z_1$ | = | 0000000000000000Field X-100000000 |
| $Y_1$ | = | 0000000000000000Field Y-100000000 |
| $X_2$ | = | 000000000000000000000000000Field X-2 |
| $Z_2$ | = | 00000000Field X-20000000000000000 |
| $Y_2$ | = | 00000000Field Y-20000000000000000 |
| | * * * | |
| $X_{N-1}$ | = | 000000000 . . . 000000000000000Field X-N-1 |
| $Z_{N-1}$ | = | Field X-N-1 . . . 0000000000000000000000 |
| $Y_{N-1}$ | = | Field Y-N-1 . . . 0000000000000000000000 |

The semi-result packets $Z_{N-1}[31:0]$, $Z_2[31:0]$, $Z_1[31:0]$ and $Z_0[31:0]$ are then bitwise ORed by bitwise OR logic device 512 to generate the final result packet $Z[31:0]$. The following relationship holds true for the final result packet $Z[31:0]$:

$Z[31:0]$=Field X-N-1 . . . Field X-2 Field X-1 Field X-0

Optionally, the final result packet $Z[31:0]$ may be applied to a bitwise AND logic device 514 with a mask $DY[31:0]$ by bitwise AND logic 514 to manipulate the result packet $Z[31:0]$ as desired.

Figure 6:
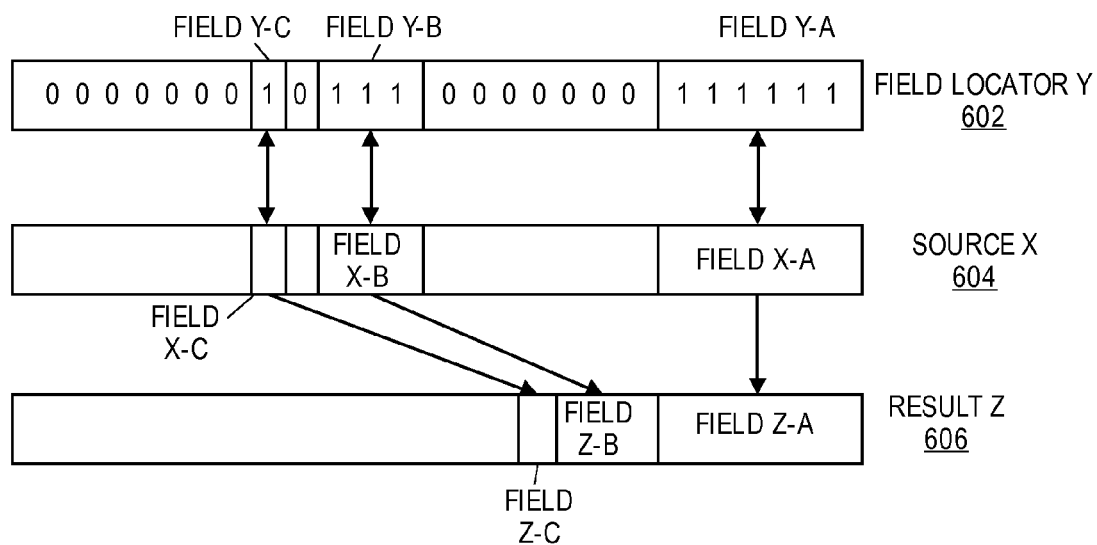
FIG. 6 illustrates diagrams of exemplary source, result, and field locator packets undergoing an EXTRACT function in accordance with an embodiment of the invention.

FIG. 6 illustrates diagrams of exemplary field locator packet Y 602, source packet X 604 and result packet Z 606 undergoing an EXTRACT function in accordance with an embodiment of the invention. In an EXTRACT function, non-adjacent or adjacent data fields in source packet X 604 identified by corresponding fields in the same bit position in the field locator packet Y 602 are copied to adjacent fields located at the least significant bits of the result packet Z 606. For instance, the data fields Field X-A, Field X-B, and Field X-C in source packet X 604 which are identified by corresponding fields Field Y-A, Field Y-B, and Field Y-C in field locator packet Y 602 at the same bit positions are copied respectively to adjacent data fields Field Z-A, Field Z-B, and Field Z-C at the least significant bits of result packet Z 606.

The field locator packet Y defines the source fields Field X-A, Field X-B, and Field X-C of source packet X 604. For instance, the field locator packet Y has three fields Field Y-A, Field Y-B, and Field Y-C with their respective bits being asserted. The remaining fields of the field locator packet Y have their respective bits non-asserted. The asserted fields Field Y-A, Field Y-B, and Field Y-C of the field locator packet Y has the same respective bit position as the source data fields Field X-A, Field X-B, and Field X-C of result packet X 604. This is the way that the field locator packet Y identifies the locations of Field X-A, Field X-B, and Field X-C of the source packet X 604.

Figure 7:
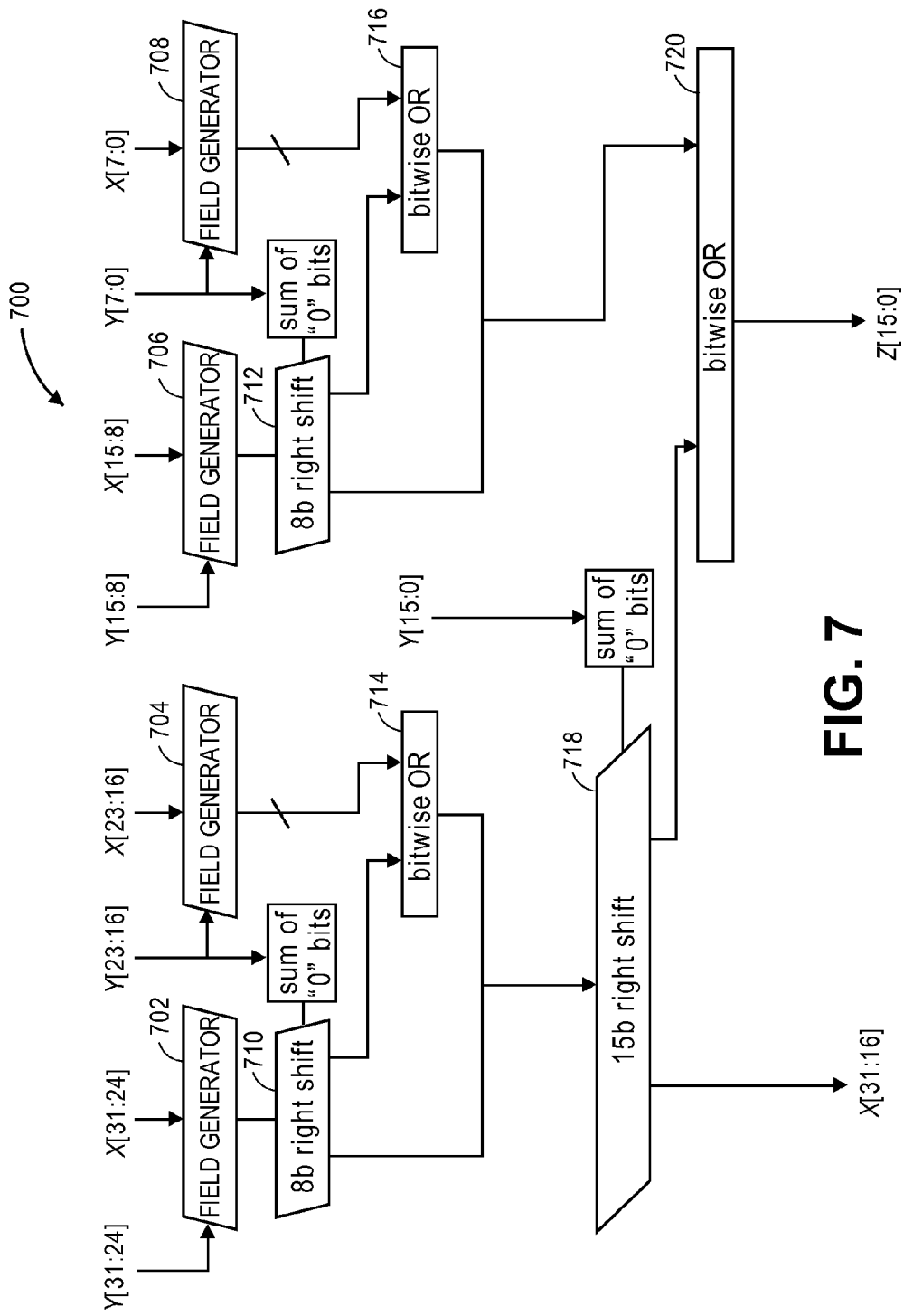
FIG. 7 illustrates a block diagram of an exemplary EXTRACT logic device that performs the EXTRACT function in accordance with an embodiment of the invention.

FIG. 7 illustrates a block diagram of an exemplary EXTRACT logic device 700 that performs the EXTRACT function in accordance with an embodiment of the invention. The EXTRACT logic device 700 comprises a plurality of field generators 702, 704, 706 and 708, a pair of 8-bit right shifters 710 and 712, a pair of bitwise OR logic devices 714 and 716, a 16-bit right shifter 718, and another bitwise OR logic device 720. Field generator 708 receives as inputs the 8 least significant bits $X[7:0]$ respectively of the source packet X and the field locator packet Y. Field generator 706 receives as inputs the second eight (8) significant bits $X[15:8]$ and $Y[15:8]$ respectively of the source packet X and the field locator packet Y. Field generator 704 receives as inputs the third eight (8) significant bits $X[23:16]$ and $Y[23:16]$ respectively of the source packet X and the field locator packet Y. And, field generator 702 receives as inputs the fourth eight (8) significant bits $X[31:24]$ and $Y[31:24]$ respectively of the source packet X and the field locator packet Y.

The output of field generator 706 is coupled to the input of the 8-bit right shifter 712 which also receives the number of non-asserted bits (0s) within the eight (8) least significant bits $Y[7:0]$ of the field locator packet Y to control the amount of right shifting. The 8 least significant bit output of the 8-bit right shifter 712 is coupled to an input of the bitwise OR logic device 716, which also receives the output of field generator 708. The 8 most significant bit output of the 8-bit right shifter 712 is merged with the output of the bitwise OR logic 716, and the merged 16 bit number is applied to an input of the bitwise OR logic device 720. The output of the bitwise OR logic device 720 generates the 16 least significant bits $Z[15:0]$ of the result packet Z.

Similarly, the output of field generator 702 is coupled to the input of the 8-bit right shifter 710 which also receives the number of non-asserted bits (0s) within bits $Y[23:16]$ of the field locator packet Y to control the amount of right shifting. The 8 least significant bit output of the 8-bit right shifter 710 is coupled to an input of the bitwise OR logic device 714, which also receives the output of field generator 704. The 8 most significant bit output of the 8-bit right shifter 710 is merged with the output of the bitwise OR logic device 714, and the merged 16 bit number is applied to an input of the 16-bit right shifter 718. The amount of right shifting performed by the 16-bit right shifter 718 depends on the number of non-asserted bits (0s) in the 16 least significant bits $Y[15:0]$ of the field locator packet Y. The 16 least significant bit output of the 16-bit right shifter 718 is coupled to an input of the bitwise OR logic device 720 and the 16 most significant bit output of the 16-bit right shifter 718 generates the 16 most significant bits of the result packet $Z[31:16]$.

Figure 8:
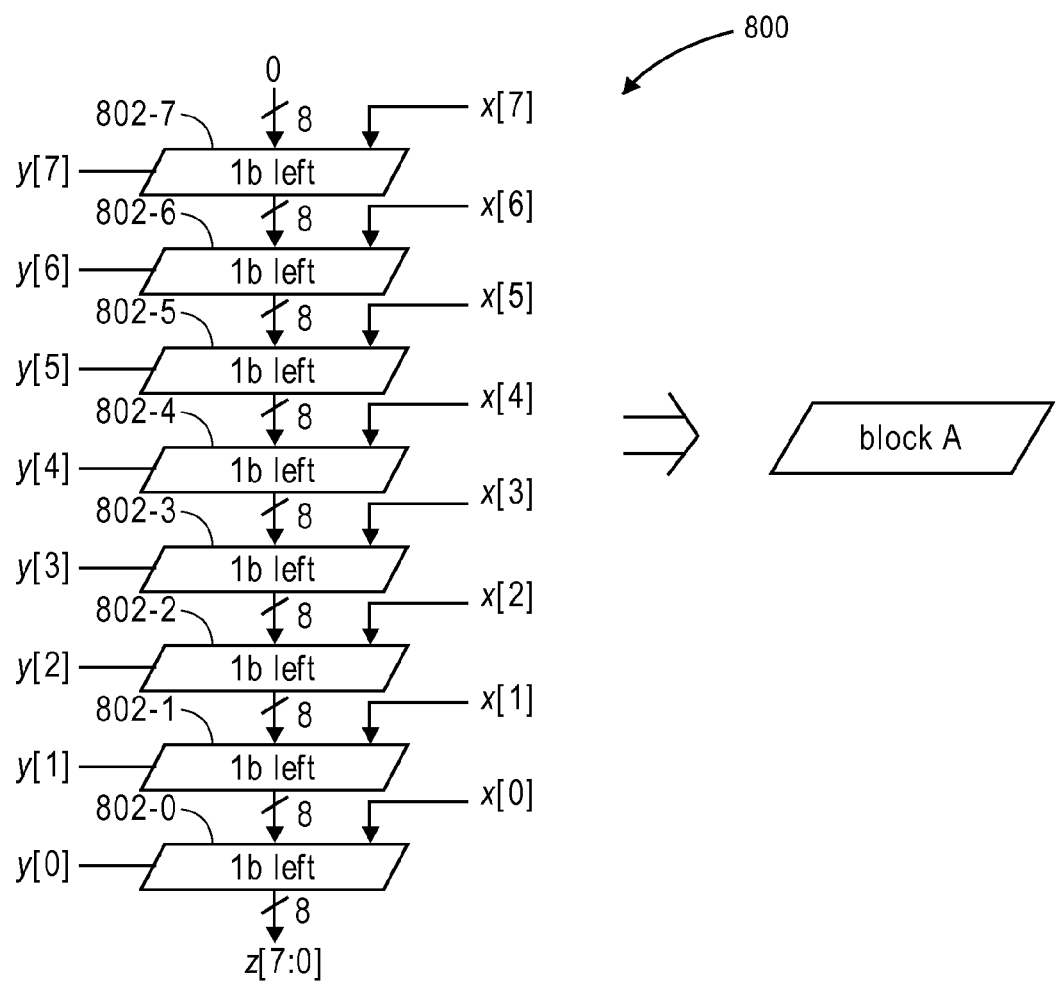
FIG. 8 illustrates a block diagram of an exemplary sub-device of the EXTRACT logic device that performs the EXTRACT function in accordance with another embodiment of the invention.

FIG. 8 illustrates a block diagram of an exemplary field generator 800 as used in the EXTRACT logic device 700 in accordance with another embodiment of the invention. Field generator 708 with its inputs $X[7:0]$ and $Y[7:0]$ will serve to demonstrate its structure and operation. It shall be understood that the other field generators 706, 704, and 702 are structurally the same, except for the inputs $X[15:8]$, $Y[15:8]$, and $X[23:16]$, $Y[23:16]$, and $X[31:24]$, $Y[31:24]$ being substituted respectively for $X[7:0]$, $Y[7:0]$.

The EXTRACT field generator 800 comprises a plurality of 1-bit left shifters 802-0 through 802-7 being cascaded together. A null 8-bit word along with the bit $X[7]$ of the source packet X as a carry-in are applied to the 1-bit left shifter 802-7. The bit $Y[7]$ controls whether the 1-bit left shifter 802-7 left shifts or not. Specifically, if bit $Y[7]$ is asserted (i.e. a logic one), then the 1-bit left shifter 802-7 left shifts its input by one bit. The output of the 1-bit left shifter 802-7 along with bit $X[6]$ as a carry-in are applied to the input of 1-bit left shifter 802-6. The bit $Y[6]$ controls whether the 1-bit left shifter 802-6 left shifts or not in the same fashion. The output of the 1-bit left shifter 802-6 along with bit X[5] as a carry-in are applied to the input of 1-bit left shifter 802-5. The bit Y[5] controls whether the 1-bit left shifter 802-5 left shifts or not in the same fashion. The output of the 1-bit left shifter 802-5 along with bit X[4] as a carry-in are applied to the input of 1-bit left shifter 802-4. The bit Y[4] controls whether the 1-bit left shifter 802-4 left shifts or not in the same fashion.

The output of the 1-bit left shifter 802-4 along with bit X[3] as a carry-in are applied to the input of 1-bit left shifter 802-3. The bit Y[3] controls whether the 1-bit left shifter 802-3 left shifts or not in the same fashion. The output of the 1-bit left shifter 802-3 along with bit X[2] as a carry-in are applied to the input of 1-bit left shifter 802-2. The bit Y[2] controls whether the 1-bit left shifter 802-2 left shifts or not in the same fashion. The output of the 1-bit left shifter 802-2 along with bit X[1] as a carry-in are applied to the input of left shifter 802-1. The bit Y[1] controls whether the 1-bit left shifter 802-1 left shifts or not in the same fashion. The output of the 1-bit left shifter 802-1 along with bit X[0] as a carry-in are applied to the input of left shifter 802-0. The bit Y[0] controls whether the 1-bit left shifter 802-0 left shifts or not in the same fashion. The output of the 1-bit left shifter 802-0 generates bits Z[7:0] of the result packet Z.

As an example, the following source X, result Z, and field locator Y packets are used to illustrate the operation of the logic device 700:

| | |
|---|---|
| 10011100101010111010010011000101 | Source X |
| 00000000000000101100001110110101 | Result Z |
| 10110111000101110010110001100111 | Field Locator Y |

The eight (8) least significant bits X[7:0] (11000101) of the source packet X and the eight (8) least significant bits Y[7:0] (01100111) of the field locator packet Y are applied to the inputs of the EXTRACT field generator 708. Based on these two inputs X[7:0] and Y[7:0], the EXTRACT field generator 708 outputs in 8-bit format (00010101).

The next eight (8) significant bits X[15:8] (10100100) of the source packet X and the next eight (8) significant bits Y[15:8] (00101100) of the field locator packet Y are applied to the inputs of the EXTRACT field generator 706. Based on these two inputs X[15:8] and Y[15:8], the EXTRACT field generator 706 outputs in 8-bit format (00000101), which is an input to the 8-bit right shifter 712.

Since the eight (8) least significant bits Y[7:0] of the field locator Y include three (3) non-asserted bits (i.e. logic zeros), the 8-bit right shifter 712 right shifts its input three (3) times to output in 16-bit format (0000000010100000). The eight (8) least significant bits of the 8-bit right shifter 712 output is bitwise ORed with the output of the EXTRACT field generator 708 by the bitwise OR logic device 716. Accordingly, the output of the bitwise OR logic device 716 in 8-bit format is (10110101). This output is merged with the eight (8) most significant bits of the output of the 8-bit right shifter 712 to form (0000000010110101) as an input to the bitwise OR logic device 720.

The next eight (8) significant bits X[23:16] (10101011) of the source packet X and the next eight (8) significant bits Y[23:16] (00010111) of the field locator packet Y are applied to the inputs of the EXTRACT field generator 704. Based on these two inputs X[23:16] and Y[23:16], the EXTRACT field generator 704 outputs in 8-bit format (00000011), which is an input to the bitwise OR logic device 714.

The next eight (8) significant bits X[31:24] (10011100) of the source packet X and the next eight (8) significant bits Y[31:24] (10110111) of the field locator packet Y are applied to the inputs of the EXTRACT field generator 702. Based on these two inputs X[31:24] and Y[31:24], the EXTRACT field generator 702 outputs in 8-bit format (00101100), which is an input to 8-bit right shifter 710.

Since bits Y[23:16] of the field locator Y include four (4) non-asserted bits (i.e. logic zeros), the 8-bit right shifter 710 right shifts its input four (4) times to output in 16-bit format (0000001011000000). The eight (8) least significant bits of the 8-bit right shifter 710 output is bitwise ORed with the output of the EXTRACT field generator 704 by the bitwise OR logic device 714. Accordingly, the output of the bitwise OR logic device 714 in 8-bit format is (11000011). This output is merged with the eight (8) most significant bits of the output of the 8-bit right shifter 710 to form (0000001011000011) as an input to the 16-bit right shifter 718.

The 16-bit right shifter 718 right shifts its input according to the number of non-asserted bits in bits Y[15:0], which in this example is eight (8). Accordingly, the output of the 16-bit right shifter 718 in 32-bit format is:

(00000000000000101100001100000000)

The 16 least significant bits of the 16-bit right shifter 718 output is bitwise ORed with the other input of the bitwise OR logic device 720. Accordingly, the output of the bitwise OR logic device 720 in 16-bit format is (1100001110110101), which is the 16 least significant bits Z[15:0] of the result packet Z. This output is merged with the 16 most significant bits of the output of the 16-bit right shifter 718 (0000000000000010), which is also the 16 most significant bits Z[31:16] of the result packet Z.

Figure 9:
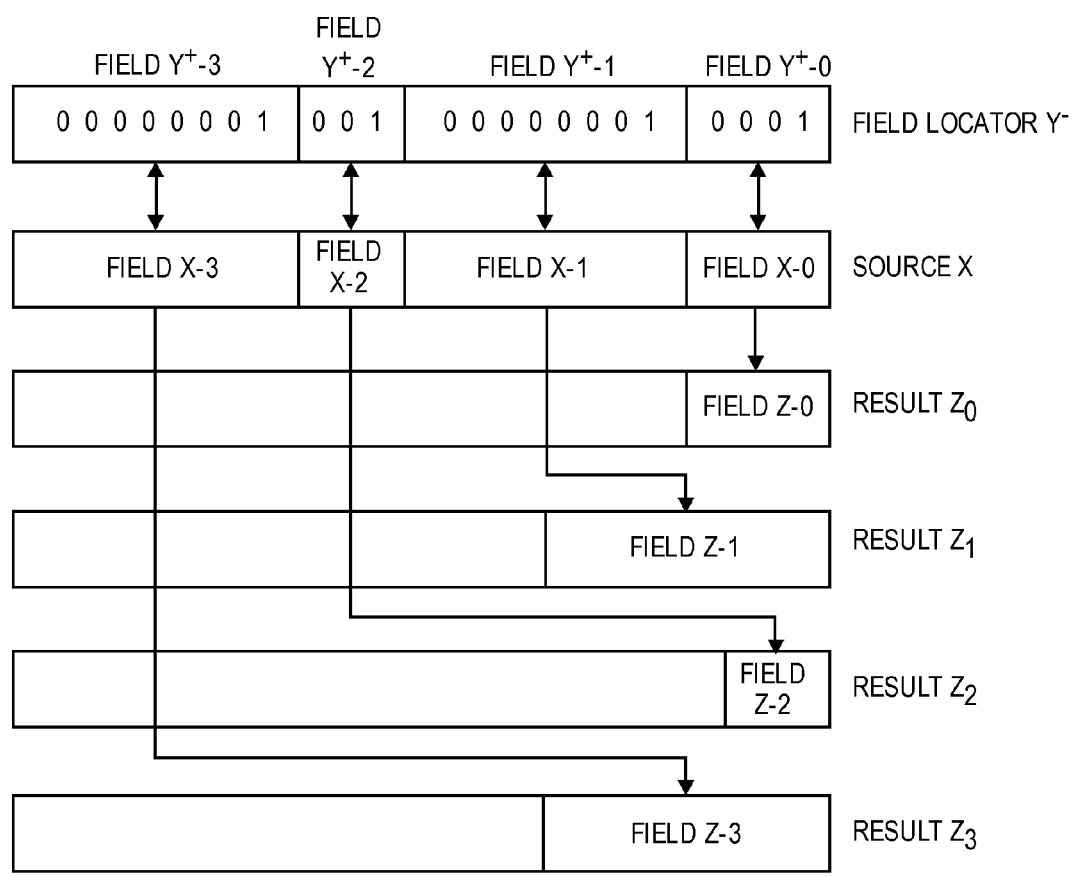
FIG. 9 illustrates diagrams of a plurality of exemplary results, source, and field locator packets undergoing a SCATTER function in accordance with an embodiment of the invention.

FIG. 9 illustrates diagrams of a source packet X, a plurality of result packets $Z_0$, $Z_1$, $Z_2$, and $Z_3$, and a field locator packet $Y^+$ undergoing a SCATTER function in accordance with an embodiment of the invention. According to the SCATTER function, a data field Field X-0 of source packet X is to be copied to a corresponding field Field Z-0 comprising the least significant bits of result packet $Z_0$. Also, a data field Field X-1 adjacent to data field X-0 of source packet X is to be copied to a corresponding field Field Z-1 comprising the least significant bits of result packet $Z_1$. Similarly, a data field Field X-2 adjacent to data field X-1 of source packet X is to be copied to a corresponding field Field Z-2 comprising the least significant bits of result packet $Z_2$. And, a data field Field X-3 adjacent to data field X-2 of source packet X is to be copied to a corresponding field Field Z-3 comprising the least significant bits of result packet $Z_3$.

The field locator packet $Y^+$ defines the data Fields X-0, X-1, X-2 and X-3 within the source packet X. In this example, the field locator packet $Y^+$ includes Fields $Y^+$-0, $Y^+$-1, $Y^+$-2, and $Y^+$-3. Field $Y^+$-0 comprises an asserted least significant bit which defines the beginning of the field followed by four (4) zeros to define the extent of the field. Field $Y^+$-1 comprises an asserted least significant bit which defines the beginning of the field followed by eight (8) zeros to define the extent of the field. Field $Y^+$-2 comprises an asserted least significant bit which defines the beginning of the field followed by two (2) zeros to define the extent of the field. And, Field $Y^+$-3 comprises an asserted least significant bit which defines the beginning of the field followed by six (6) zeros to define the extent of the field. The bit positions of Fields $Y^+$-0, $Y^+$-1, $Y^+$-2, and $Y^+$-3 of the field locator packet $Y^+$ are the same as, and therefore define, the bit positions of data Fields X-0, X-1, X-2 and X-3 within the source packet X. Again, the field locator, source, and result packets illustrated in FIG. 9 are merely examples, other variations of the data fields are possible.

Figure 10:
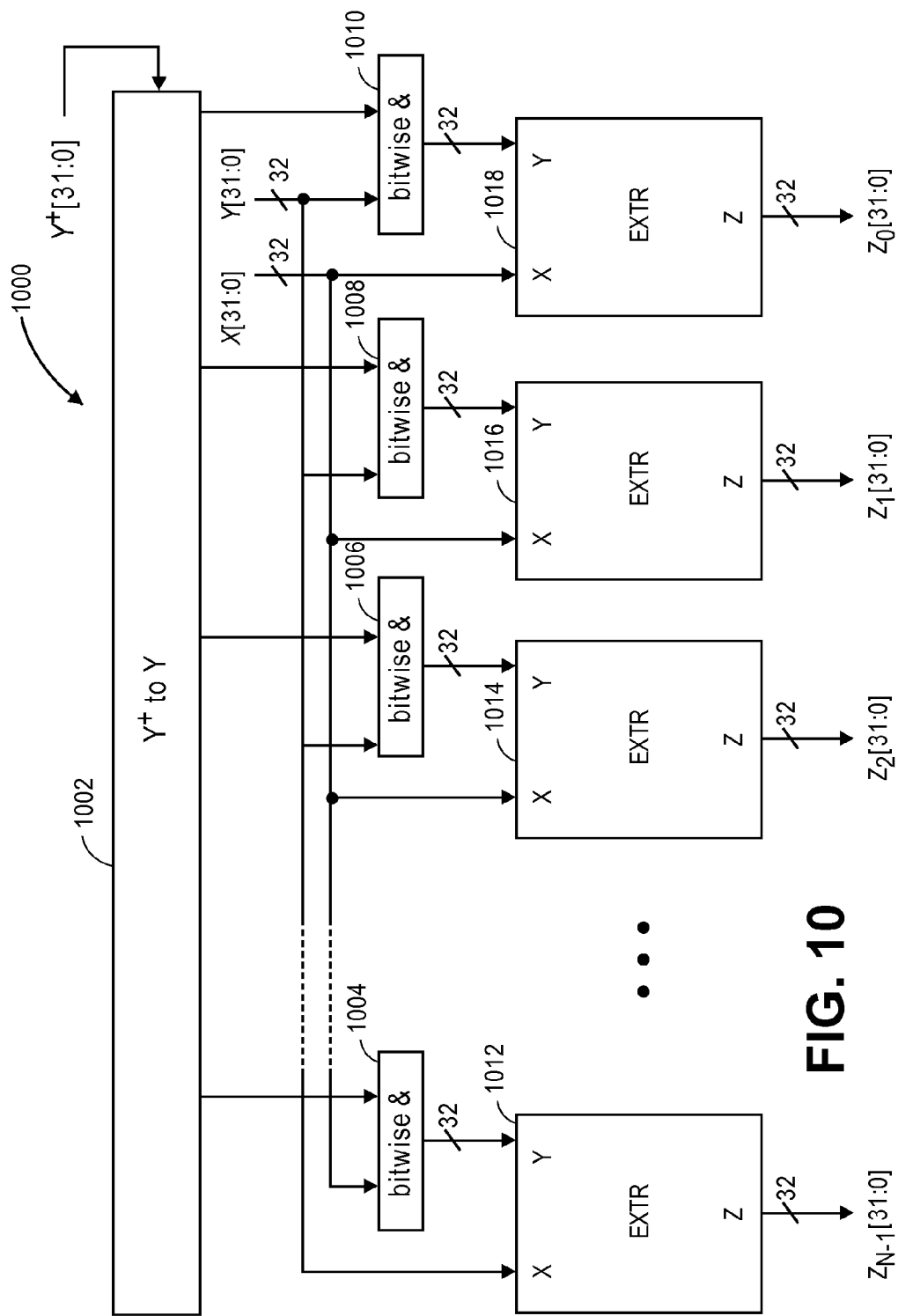
FIG. 10 illustrates a block diagram of an exemplary SCATTER logic device that performs the SCATTER function in accordance with an embodiment of the invention.

FIG. 10 illustrates a block diagram of an exemplary SCATTER logic device 1000 that performs the SCATTER function in accordance with an embodiment of the invention. The logic device 1000 comprises a $Y^+$-to-Y converter 1002, a plurality of bitwise AND logic devices 1004, 1006, 1008, and 1010, and a plurality of EXTRACT logic devices 1012, 1014, 1016 and 1018 which are the same as the EXTRACT logic device 700 previously discussed. The $Y^+$-to-Y converter 1002 performs the same conversion as $Y^+$-to-Y converter 502 previously discussed.

As shown in FIG. 10, the bitwise AND logic devices 1010, 1008, 1006 and 1004 respectively receive as inputs the source packet X[31:0] and the converted field locator packets $Y_0$[31:0], $Y_1$[31:0], $Y_2$[31:0] and $Y_{N-1}$[31:0]. The EXTRACT logic devices 1018, 1016, 1014, and 1012 receive as inputs the source packet X[31:0] and respectively the outputs of the bitwise AND logic devices 1010, 1008, 1006 and 1004. The EXTRACT logic devices 1012, 1014, 1016, and 1018 generate at their respective outputs the result packets $Z_{N-1}$[31:0], $Z_2$[31:0], $Z_1$[31:0] and $Z_0$[31:0]. Taking the example shown in FIG. 4, the following relationship holds:

| | | |
|---|---|---|
| $Y+$ | = | Field Y-N-1 . . . FieldY-2Field Y-1Field Y-0 |
| X | = | Field X-N-1 . . . FieldX-2Field X-1Field X-0 |
| $Z_0$ | = | 000000000000000000000000Field X-0 |
| $Y_0$ | = | 000000000000000000000000Field Y-0 |
| $Z_1$ | = | 000000000000000000000000Field X-1 |
| $Y_1$ | = | 000000000000000000000000Field Y-1 |
| $Z_2$ | = | 000000000000000000000000Field X-2 |
| $Y_2$ | = | 000000000000000000000000Field Y-2 |
| | * * * | |
| $Z_{N-1}$ | = | 000000000000000000000000Field X-N-1 |
| $Y_{N-1}$ | = | 000000000000000000000000Field Y-N-1 |

In the foregoing specification, the invention has been described with reference to specific embodiments thereof. It will, however, be evident that various modifications and changes may be made thereto without departing from the broader spirit and scope of the embodiments of the invention. The specification and drawings are, accordingly, to be regarded in an illustrative rather than a restrictive sense.

It is claimed:

1. An apparatus, comprising:
a plurality of field generators to generate respective portions of a result packet, wherein the first field generator receives a portion of a source packet, wherein at least one of said field generators comprises
a plurality of multiplexers with respective first inputs receiving non-asserted bits, wherein the outputs of said multiplexers generate a corresponding portion of said result packet, and
a plurality of cascaded 1-bit right shifters with the outputs coupled to respective second inputs of said multiplexers except for one of said multiplexers; and
a plurality of cascaded right shifters, wherein the output of said right shifters are coupled to respective inputs of said field generators except said first generator, wherein the first cascaded right shifter receives said source packet, and wherein an amount of right shifting of said right shifters is governed by a field locator packet.

2. An apparatus, comprising:
a plurality of logic devices to generate respective destination data fields in a result packet Z, each logic device comprising:
a plurality of field generators to generate respective portions of respective semi-result packets, wherein a first field generator of said plurality of field generators receives portions of a source packet;
a plurality of cascaded right shifters, wherein an output of each of said right shifters are coupled to respective inputs of said plurality of field generators other than said first field generator, and wherein a first cascaded right shifter of said plurality of cascaded right shifters receives said source packet;
a bitwise OR logic to bitwise OR said semi-result packets; and
a converter to convert a first field locator packet comprising a plurality of field locator data fields each comprising an asserted least significant bit followed by one or more non-asserted bits to a plurality of second field locator packets each comprising a plurality of field locator data fields each comprising asserted bits, and wherein an amount of right shifting of said right shifters in said logic device is governed by said second field locator packets.

3. The apparatus of claim 2, wherein at least one of said field generator comprises:
a plurality of multiplexers with respective first inputs receiving non-asserted bits, wherein the outputs of said multiplexers generate a corresponding portion of said result packet; and
a plurality of cascaded 1-bit right shifters with the outputs coupled to the respective second inputs of said multiplexers except for one of said multiplexers.

4. An apparatus, comprising:
a plurality of logic devices to generate respective destination data fields in respective result packets, each logic device comprising:
a plurality of field generators to generate respective portions of respective result packets from respective portions of a source packet;
a shifter for each pair of field generators, wherein said shifter shifts said respective portion of said result packet from one of the pair of field generators to a bit position that is adjacent to said result packet from the other of the pair of field generators; and
a converter to convert a first field locator packet comprising a plurality of field locator data fields each comprising an asserted least significant bit followed by one or more non-asserted bits to a plurality of second field locator packets each comprising a plurality of field locator data fields each comprising asserted bits, and wherein an amount of right shifting of said shifters in said logic device is governed by said second field locator packets.

5. The apparatus of claim 4, further comprising a plurality of bitwise AND logic devices to bitwise AND the output of the converter with the source packets to form said second field locator packets.

6. The apparatus of claim 4, wherein at least one of said field generators comprises a plurality of cascaded shifters with respective first inputs to receive respective portions of said source packet.

* * * * *